US010807897B2

(12) United States Patent
Gullinkala et al.

(10) Patent No.: US 10,807,897 B2
(45) Date of Patent: Oct. 20, 2020

(54) PROCESS AND APPARATUS FOR REFINING MOLTEN GLASS

(71) Applicant: Owens-Brockway Glass Container Inc., Perrysburg, OH (US)

(72) Inventors: Tilak Gullinkala, Perrysburg, OH (US); Desikan Sundararajan, Sugar Land, TX (US); Terence J. Clark, Bowling Green, OH (US); Witold Mastek, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 409 days.

(21) Appl. No.: 15/702,896

(22) Filed: Sep. 13, 2017

(65) Prior Publication Data
US 2018/0002214 A1 Jan. 4, 2018

Related U.S. Application Data

(63) Continuation of application No. 14/298,422, filed on Jun. 6, 2014, now Pat. No. 9,776,904.

(51) Int. Cl.
C03B 5/225 (2006.01)
C03B 5/235 (2006.01)

(52) U.S. Cl.
CPC .......... C03B 5/2257 (2013.01); C03B 5/2252 (2013.01); C03B 5/2356 (2013.01)

(58) Field of Classification Search
CPC .. C03B 5/2257; F28C 3/10; F28C 3/12; F28C 3/14; F28C 3/16; F28C 3/18
USPC ................................. 65/134.9, 346
See application file for complete search history.

(56) References Cited

U.S. PATENT DOCUMENTS

| | | | |
|---|---|---|---|
| 1,594,496 A | 8/1926 | Clark | |
| 1,598,308 A | 8/1926 | Pike | |
| 2,615,703 A | 10/1948 | Weber | |
| 2,512,761 A | 6/1950 | Arbeit | |
| 2,686,820 A | 8/1954 | Arbeit et al. | |
| 2,936,549 A | 2/1956 | Stinnes et al. | |
| 2,773,111 A | 12/1956 | Arbeit et al. | |
| 3,104,955 A | 9/1963 | Marchand | |
| 3,172,757 A | 3/1965 | Hess et al. | |

(Continued)

FOREIGN PATENT DOCUMENTS

| | | |
|---|---|---|
| GB | 796216 A | 6/1958 |
| JP | 57095834 | 6/1982 |
| JP | 01192738 | 8/1989 |

OTHER PUBLICATIONS

PCT International Search Report and Written Opinion, Int. App. No. PCT/US2015/032549, Int. Filing Date: May 27, 2015, Applicant: Owens-Brockway Glass Container Inc., dated Aug. 17, 2015.

(Continued)

Primary Examiner — Erin Snelting

(57) ABSTRACT

An apparatus for refining molten glass that includes a housing having a vertically oriented longitudinal axis and a transverse axis perpendicular to the longitudinal axis. Molten glass is received at an upper end of the housing and is discharged from a lower end of the housing. A guide extends at least partway across the housing and directs molten glass in a generally downward direction through the housing and in a parallel or oblique direction relative to the transverse axis of the housing.

22 Claims, 4 Drawing Sheets

(56) References Cited

U.S. PATENT DOCUMENTS

| | | |
|---|---|---|
| 3,320,045 A | 5/1967 | Weiss et al. |
| 3,330,046 A * | 7/1967 | Albertus .................. F28C 3/12 |
| | | 34/363 |
| 3,938,981 A | 2/1976 | St. John |
| 3,979,197 A | 9/1976 | Froberg |
| 4,045,197 A | 8/1977 | Tsai et al. |
| 4,204,855 A | 5/1980 | Monteyne |
| 4,289,519 A | 9/1981 | Monteyne |
| 4,398,925 A | 8/1983 | Trinh et al. |
| 4,406,683 A | 9/1983 | Demarest, Jr. |
| 4,504,302 A | 3/1985 | Carman |
| 4,537,609 A | 8/1985 | McEathron |
| 4,559,072 A | 12/1985 | Harcuba |
| 5,241,558 A | 8/1993 | Nagashime et al. |
| 5,849,058 A | 12/1998 | Takeshita et al. |
| 5,992,041 A | 11/1999 | McClaine et al. |
| 6,119,484 A | 9/2000 | Takei et al. |
| 6,286,337 B1 | 9/2001 | Palmquist |
| 6,401,492 B1 | 6/2002 | Nattermann |
| 6,405,564 B1 | 6/2002 | Takei et al. |
| 6,460,376 B1 | 10/2002 | Jeanvoine et al. |
| 6,577,667 B1 | 6/2003 | Romer et al. |
| 6,588,233 B2 | 7/2003 | Nattermann |
| 6,615,612 B2 | 9/2003 | Alexander |
| 6,739,152 B2 | 5/2004 | Jeanvoine et al. |
| 6,854,290 B2 | 2/2005 | Hayes et al. |
| 7,134,300 B2 | 11/2006 | Hayes et al. |
| 7,150,165 B2 | 12/2006 | Pitbladdo |
| 7,377,132 B2 | 5/2008 | Hamashima et al. |
| 7,475,568 B2 | 1/2009 | Bookbinder et al. |
| 7,565,819 B2 | 7/2009 | Jeanvoine et al. |
| 7,584,632 B2 | 9/2009 | House |
| 7,624,595 B2 | 12/2009 | Jeanvoine et al. |
| 7,854,144 B2 | 12/2010 | DeLamielleure et al. |
| 7,874,179 B2 | 1/2011 | Rue et al. |
| 7,980,752 B2 | 7/2011 | Sarvazyan |
| 8,156,766 B2 | 4/2012 | Pitbladdo |
| 8,196,434 B2 | 6/2012 | Pitbladdo |
| 2006/0042318 A1 | 3/2006 | Burdette et al. |
| 2007/0089460 A1 | 4/2007 | Linding et al. |
| 2007/0084247 A1 | 8/2007 | Pitbladdo |
| 2009/0249834 A1 | 10/2009 | Rue et al. |

OTHER PUBLICATIONS

EP Examination Report, Application No. 15728984.4-1105, Applicant: Owens-Brockway Glass Container Inc., dated Oct. 5, 2018.

* cited by examiner

PROCESS AND APPARATUS FOR REFINING MOLTEN GLASS

The present disclosure is directed to a process and an apparatus for refining glass.

BACKGROUND AND SUMMARY OF THE DISCLOSURE

Silica-based glass, such as soda-lime-silica glass, is prevalent in the manufacture of glass containers and other articles. Molten glass used to make such articles is conventionally prepared by melting various glass-forming materials in a furnace or tank at elevated temperature. During this process, gases (e.g., $SO_2$, $CO_2$, $H_2O$, etc.) are produced, which may evolve to form gas bubbles or "seeds" within the molten glass. The process of removing gas bubbles and/or dissolved gases from molten glass is referred to as "refining" or "degassing."

A general object of the disclosure, in accordance with one aspect of the disclosure, is to provide an apparatus for refining molten glass that promotes the rapid release of gas bubbles therefrom and thereby reduces the time needed to refine the molten glass, or the "refining time."

The present disclosure embodies a number of aspects that can be implemented separately from or in combination with each other.

An apparatus for refining molten glass, in accordance with one aspect of the disclosure, includes: a housing and a guide positioned within the housing. The housing has a vertically oriented longitudinal axis, a transverse axis perpendicular to the longitudinal axis, an inlet at an upper end to receive molten glass, and an outlet a lower end to discharge molten glass therefrom. The guide has a flow surface upon which molten glass can flow between the inlet and the outlet of the housing. The flow surface of the guide has a surface area that is greater than a transverse cross-sectional area of the housing, and, when a volume of molten glass is introduced into the housing, the volume of molten glass is distributed over the flow surface of the guide such that the surface area of the volume of molten glass is increased and the thickness of the volume molten glass is decreased.

In accordance with another aspect of the disclosure, there is provided an apparatus for refining molten glass that includes: a housing having a vertically oriented longitudinal axis and a transverse axis perpendicular to the longitudinal axis, an inlet at an upper end of the housing to receive molten glass, an outlet at a lower end of the housing to discharge molten glass from the housing, and a guide extending at least partway across the housing. The guide directs molten glass in a generally downward direction through the housing and in a parallel or oblique direction relative to the transverse axis of the housing such that molten glass flowing from the upper end to the lower end of the housing moves relative to the longitudinal axis of the housing. In some embodiments, the molten glass may be directed through the housing such that the molten glass repeatedly intersects the longitudinal axis of the housing. In other embodiments, the molten glass may be directed by the guide such that the molten glass repeatedly passes from one side of the longitudinal axis of the housing to another, without physically intersecting the longitudinal axis. For example, the molten glass may be directed such that the molten glass repeatedly revolves around the longitudinal axis of the housing. In another embodiment, the guide may include a series of guides that direct the molten glass through the housing such that the molten glass cascades over the guides in succession.

In accordance with yet another aspect of the disclosure, there is provided a process for refining molten glass that includes: (a) introducing molten glass into an upper end of a housing having a vertically oriented longitudinal axis and a transverse axis perpendicular to the longitudinal axis, (b) flowing the molten glass over a guide such that the molten glass flows in a generally downward direction through the housing and in a parallel or oblique direction relative to the transverse axis of the housing, and then (c) discharging the molten glass from a lower end of the housing.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1:
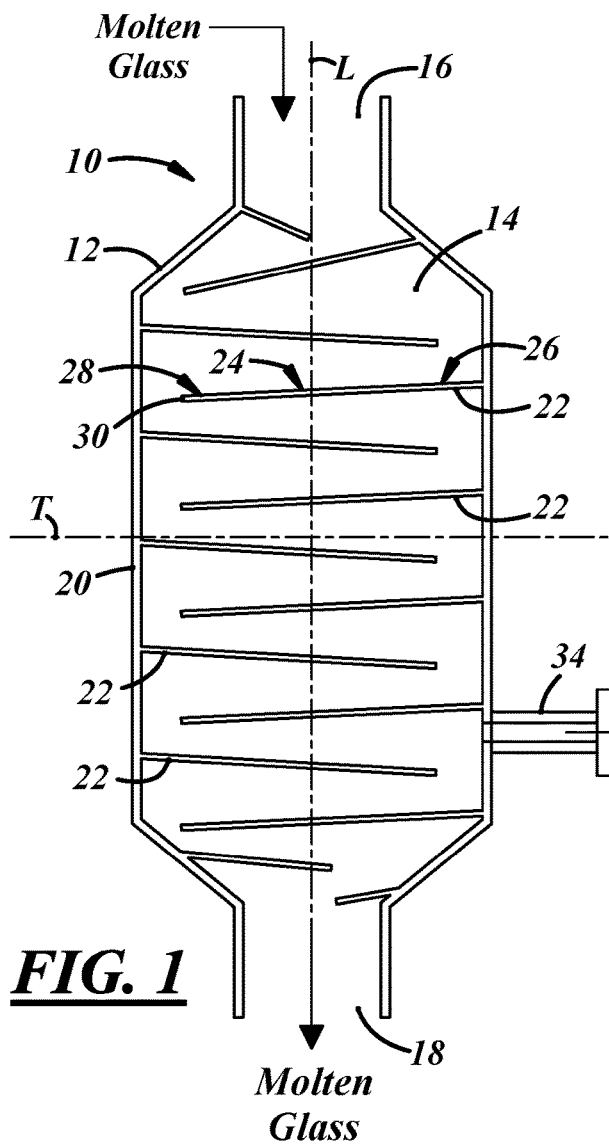
FIG. 1 is a schematic illustration of a side sectional view of an apparatus for refining molten glass, in accordance with one embodiment of the disclosure.

FIG. 1 illustrates an apparatus 10, in accordance with one embodiment of the present disclosure, for refining molten glass. The apparatus 10 includes a housing 12 that defines an inner chamber 14 and has a vertically oriented longitudinal axis L and a transverse axis T perpendicular to the longitudinal axis L. Unrefined molten glass is received at an upper end of the housing 12 and refined molten glass is discharged from a lower end of the housing 12. The housing 12 includes an inlet 16 through which a stream of unrefined molten glass may be received, an outlet 18 through which a stream of refined molten glass may be discharged, and a sidewall 20 that extends between the inlet 16 and the outlet 18 of the housing 12. In the embodiment illustrated in FIG. 1, the sidewall 20 of the housing 12 is cylindrical and the housing 12 has a transverse cross section that is circular in shape. In other embodiments, however, the transverse cross section of the housing 12 may take on different shapes. For example, in other embodiments, the housing 12 may have an elliptical or polygonal transverse cross-sectional shape.

The housing 12 may have a longitudinal length measured along the longitudinal axis L thereof and a width measured along the transverse axis T. The length of the housing 12 may be substantially the same as the width of the housing 12, or the housing 12 may have a length greater than its width. In some specific embodiments, the length of the housing 12 may be in the range of 1-5 meters and the width of the housing 12 may be in the range of 1-5 meters. The residence time of a volume of molten glass flowing through a housing 12 having such dimensions may be in the range of 1-12 hours, and such housing 12 may produce about 50 tons to about 300 tons of refined molten glass per day.

Molten glass is received at the inlet 16 of the housing 12 and is flowed over one or more guides 22 having flow surfaces 24 upon which molten glass can flow between the upper end and the lower end of the housing 12. In particular, the guides 22 direct the molten glass in a generally downward direction through the housing 12, while also directing the molten glass in a parallel or oblique direction relative to the transverse axis T of the housing 12. Also, the molten glass is directed by the guides 22 such that the molten glass moves relative to the longitudinal axis L of the housing 12. For example, the molten glass may repeatedly traverse, pass, and/or move over, along, through, around, about, across, or back and forth with respect to the longitudinal axis L of the housing 12 as the molten glass flows from the inlet 16 to the outlet 18 of the housing 12. In some embodiments, this may mean that the molten glass intersects the longitudinal axis L of the housing 12 as it flows through the housing 12. In other embodiments, the molten glass may pass from one side of the longitudinal axis L to another without physically intersecting the longitudinal axis L. For example, the molten glass may move back and forth within the housing 12 as it flows over the guides 22, or the molten glass may revolve around the longitudinal axis L of the housing 12 as it flows from the inlet 16 to the outlet 18 of the housing 12. The guides 22 may take on a variety of different shapes, including, for example, plates, trays, steps, shelves, baffles, and/or rods, to name a few.

When a volume of molten glass is introduced into the housing 12, the volume of molten glass is distributed over the flow surfaces 24 of the guides 22 such that the surface area of the volume of molten glass is increased and the thickness of the volume of molten glass is decreased. For example, a volume of molten glass received at the inlet 16 of the housing 12 may have a surface area in the range of 0.01 square meters to five square meters and a thickness in the range of 0.5 cm to 100 cm. However, after the volume of molten glass has been distributed over the flow surfaces 24 of the guides 22, the volume of molten glass may have a surface area in the range of 0.5 square meters to 20 square meters and a thickness in the range of 0.5 cm to 35 cm, which represents 1 to 2000-fold increase in surface area and 1 to 100-fold decrease in thickness. As used herein, the "thickness" of the molten glass refers to the height or level of the molten glass above the one or more flow surfaces 24 of the one or more guides 22. Reducing the thickness of the volume of molten glass allows gas bubbles that are dissolved or trapped within the molten glass to rise to a free surface thereof and escape from the molten glass in a relatively short amount of time. Accordingly, the rate at which molten glass is flowed through the housing 12 is controlled such that the chamber 14 is never completely filled or flooded with molten glass. More specifically, the rate at which molten glass is flowed through the housing 12 is controlled such that the molten glass flowing over the flow surfaces 24 of the guides 22 has a free surface.

The overall flow surface area of the guides 22 is relatively large in comparison to the transverse cross-sectional area of the housing 12, which allows molten glass flowing through the housing 12 to be distributed over a relatively large surface area in a space having a relatively small volume. For example, the housing 12 may have a transverse cross-sectional area of between 0.5 $m^2$ and 20 $m^2$, and the overall flow surface area of the guides 22 may be between 50 $m^2$ and 500 $m^2$.

The apparatus 10 illustrated in FIG. 1 includes a series of guides 22 that are spaced apart from one another along the longitudinal axis L of the housing 12. The guides 22 extend partway across the housing 12. That is, the guides 22 extend from one side of the housing 12 across the longitudinal axis L of the housing 12, but the guides 22 do not extend entirely across the housing 12. The guides 22 illustrated in FIG. 1 extend in a downward direction at an oblique angle relative to the transverse axis T of the housing 12. However, in other embodiments, some or all of the guides 22 may extend in a substantially parallel direction to the transverse axis T of the housing 12. In some embodiments, the guides 22 may extend at a downward angle in the range of zero degrees to 30 degrees from the transverse axis T of the housing 12, and may be spaced apart from one another at distances in the range of 3-25 inches. In some specific embodiments, the guides 22 may extend at a downward angle in the range of 2-3 degrees from the transverse axis T of the chamber 14.

In the embodiment illustrated in FIG. 1, the guides 22 are alternately arranged on opposite sides of the housing 12, such that the guides 22 overlap one another along the longitudinal axis L of the housing 12. As such, when molten glass is received at an upstream end 26 of one of the guides 22, the molten glass flows across the guide 22 towards the downstream end 28 of the guide 22, and then drops from a free edge 30 of the guide 22 onto the upstream end 26 of the next lower guide 22. Also, as the molten glass flows from one guide 22 to the next, the molten glass is repeatedly deflected in opposite transverse directions such that the molten glass cascades from one guide 22 to another and makes a zigzag path through the housing 12.

A vacuum pump and evacuation system 32 may be in fluid communication with the apparatus 10 for creating a sub-atmospheric pressure environment within the housing 12. Lowering the atmospheric pressure within the housing 12 may help increase the rate at which gas bubbles are removed from the molten glass as it flows over the guides 22 and through the housing 12. In addition, the vacuum pump and evacuation system 32 may help maintain a suitably low-pressure environment within the housing 12 by continuously drawing off gases that are released from the molten glass as it flows through the housing 12. A vacuum port 34 may be provided in the housing 12 for removing or evacuating gases therefrom.

During operation, molten glass may be received at the inlet 16 of the housing 12 and may pass through multiple stages or zones as it flows to the outlet 18 of the housing 12, with each zone being characterized by different process variables. For example, the temperature and pressure may be intentionally varied at different locations within the housing 12 to create different temperature and pressure zones within the housing 12. As another example, the declination angles and spacing between the guides 22 may be different in one area of the housing 12 as compared to another, and those different areas may define different zones within the housing 12.

FIGS. 2-17 illustrate additional embodiments of apparatuses for refining molten glass. These embodiments are similar in many respects to the embodiment illustrated in FIG. 1, and like numerals among the embodiments generally designate like or corresponding elements throughout the several views of the drawing figures. Accordingly, the descriptions of the embodiments are incorporated into one another, and description of subject matter common to the embodiments generally may not be repeated here.

Figure 2:
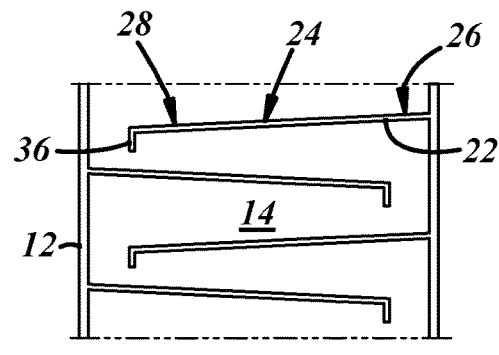
FIG. 2 is a schematic illustration of a side sectional view of a portion of an apparatus for refining molten glass, in accordance with another embodiment of the disclosure.

Referring now to FIG. 2, some or all of the guides 22 may have extensions 36 located at their downstream ends 28, which may help guide the molten glass from one guide 22 to the next lower guide 22 within the housing 12. In addition, the extensions 36 may help increase the laminarity of the flow of molten glass, for example, by preventing bubbles from becoming incorporated into the molten glass as it flows from one guide 22 to another. The extensions 36 may extend from the downstream ends 28 of the guides 22 in a direction parallel to the longitudinal axis L of the housing 12, or the extensions 36 may be angled slightly inwardly or outwardly from the downstream ends 28 of the guides 22.

Figure 3:
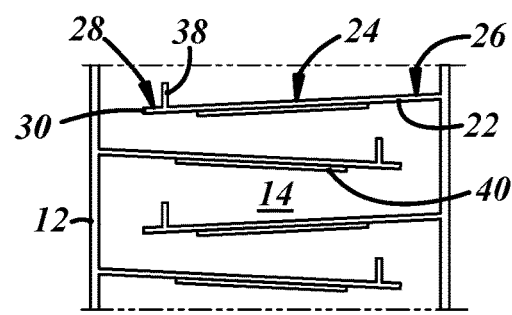
FIG. 3 is a schematic illustration of a side sectional view of a portion of an apparatus for refining molten glass, in accordance with yet another embodiment of the disclosure.

Referring now to FIG. 3, some or all of the guides 22 may include barriers 38 along their flow surfaces 24, which may help maintain a generally uniform level of molten glass over the flow surfaces 24 of the guides 22. The guides 22 also may include heaters 40 for supplying heat to the molten glass as it flows over the guides. The heaters 40 may include any suitable source of heat, and may be embedded in, mounted under, or otherwise carried by the guides 22. In the embodiment illustrated in FIG. 3, the heaters 40 are positioned below the flow surfaces 24 of the guides 22. The heaters 40 may help adjust and/or control the temperature of the molten glass as it flows through the housing 12, for example, so that the molten glass exhibits a suitable temperature for refining. In addition, the heaters 40 may help control the rate at which the molten glass is cooled as it flows through the housing 12 so that the molten glass exhibits a suitable temperature for use in downstream forming operations by the time it reaches the outlet 18 of the housing 12.

Figure 4:
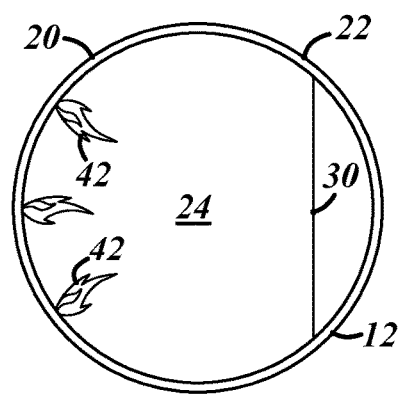
FIG. 4 is a schematic illustration of a top sectional view of an apparatus for refining molten glass, in accordance with a fourth embodiment of the disclosure.
Figure 5:
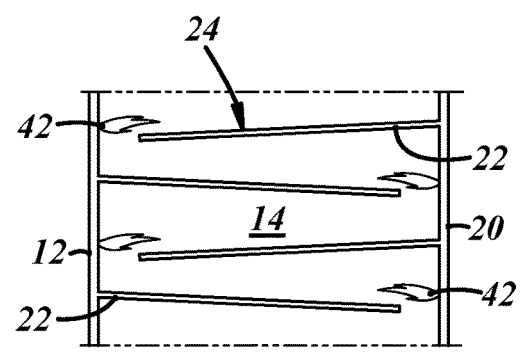
FIG. 5 is a side sectional view of a portion of the apparatus illustrated in FIG. 4.

As illustrated in FIGS. 4 and 5, the apparatus 10 also may include burners 42, which may heat the molten glass as it flows through the housing 12. The burners 42 may be positioned at various locations within the housing 12, and may be positioned such that the burners 42 extend from the sidewall 20 of the housing 12 into the chamber 14. The heaters 40, the burners 42, or both may be part of a heating system that supplies a controlled amount of heat to the molten glass flowing through the housing 12.

Figure 6:
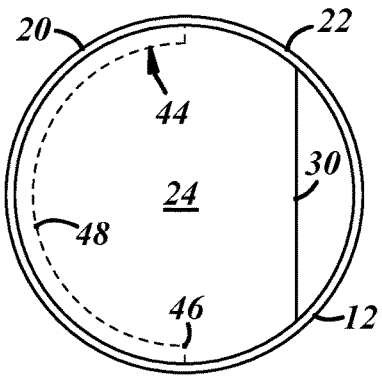
FIG. 6 is a schematic illustration of a top sectional view of an apparatus for refining molten glass, in accordance with a fifth embodiment of the disclosure.
Figure 7:
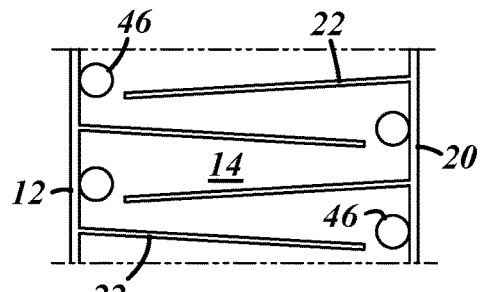
FIG. 7 is a side sectional view of a portion of the apparatus illustrated in FIG. 6.

As illustrated in FIGS. 6 and 7, the apparatus 10 also may include a ventilation system 44 to vent air and/or other gases out of the housing 12. The ventilation system 44 may include a conduit 46 with apertures 48 through which air and/or other gases can exit the housing 12. The conduit 46 may extend along the sidewall 20 of the housing 12. The vacuum pump and evacuation system 32, the ventilation system 44, the heating system, or a combination thereof may be part of an overall management system that controls the temperature and/or pressure at various locations within the housing 12.

Figure 8:
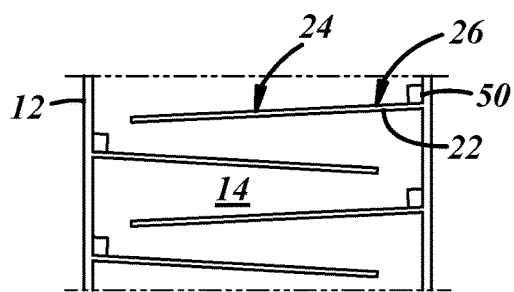
FIG. 8 is a schematic illustration of a side sectional view of a portion of an apparatus for refining molten glass, in accordance with a sixth embodiment of the disclosure.

With reference to FIG. 8, the apparatus 10 also may include one or more vibrators 50 for adding vibration energy, e.g., sonic energy, to the molten glass as it flows over the guides 22. Adding vibration energy to the molten glass may promote cavitations, which may cause gas bubbles that are dissolved or trapped within the molten glass to collide, rupture, and/or coalesce so that the gas bubbles can rise to a free surface of the molten glass and escape therefrom in a relatively short amount of time. Adding vibration energy to the molten glass may be accomplished by adding vibration energy to one or more of the guides 22, for example, by coupling the vibrators 50 to the guides 22. For example, the vibrators 50 may be carried by the guides 22, mounted on or under the guides 22, and/or embedded in the guides 22. In the embodiment illustrated in FIG. 8, the vibrators 50 are positioned along the sidewall 20 of the housing 12 and are coupled to the upstream ends 26 of the guides 22. Suitable vibrators 50 for imparting vibration energy to molten glass flowing through the housing 12 may include actuators, sonic wave generators, or sonic horns, also known as acoustic horns.

Figure 9:
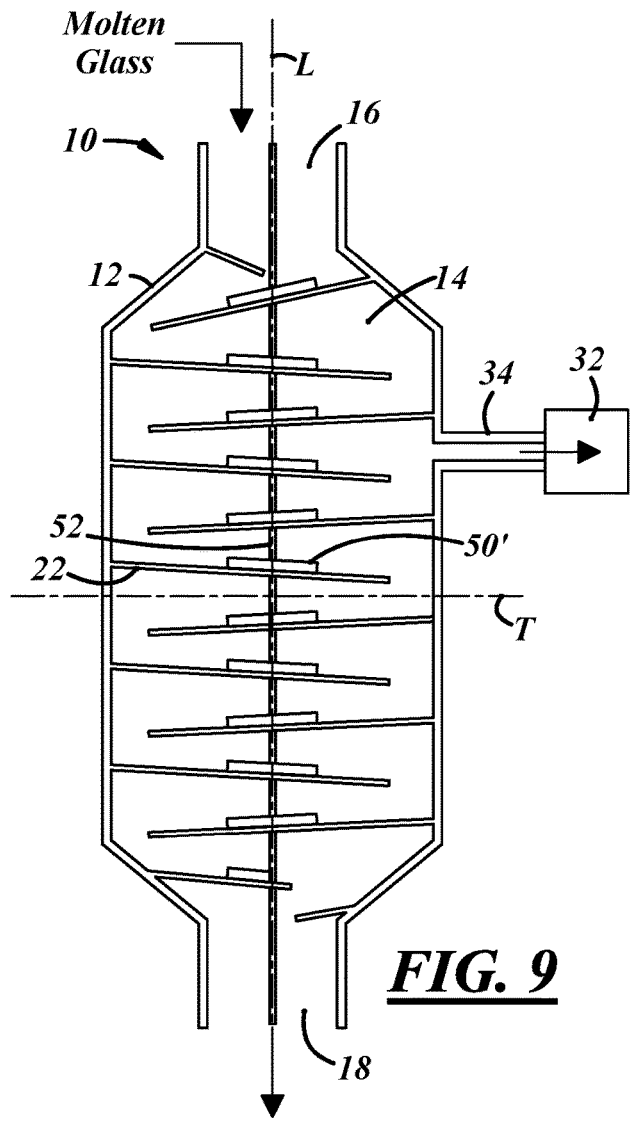
FIG. 9 is a schematic illustration of a side sectional view of an apparatus for refining molten glass, in accordance with a seventh embodiment of the disclosure.

As illustrated in FIG. 9, vibrators 50' may be coupled to the guides 22 along the longitudinal axis L of the housing 12. In this embodiment, an input member 52 extends through the housing 12 along the longitudinal axis L of the housing 12. The input member 52 may be coupled to the vibrators 50' in a manner that allows the vibrators 50' to be actuated by the input member 52. For example, the vibrators 50' may be configured to impart vibration energy to the guides 22 upon receiving vibration energy or a signal from the input member 52. The input member 52 may include a tube, or any other suitable device that can be used to actuate the vibrators 50' or otherwise impart vibration energy to the vibrators 50' and/or the guides 22.

Figure 10:
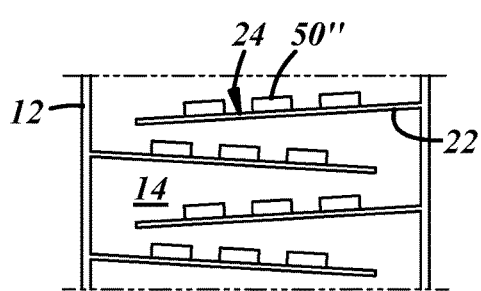
FIG. 10 is a schematic illustration of a side sectional view of a portion of an apparatus for refining molten glass, in accordance with an eighth embodiment of the disclosure.
Figure 11:
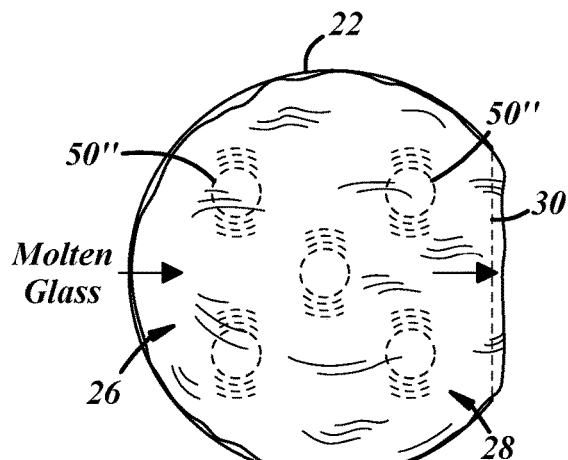
FIG. 11 is an enlarged top sectional view of the apparatus of FIG. 10.
Figure 12:
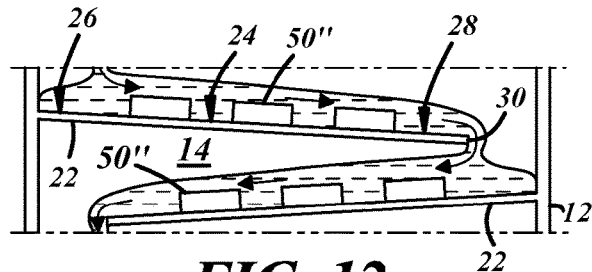
FIG. 12 is an enlarged fragmentary view of the apparatus of FIG. 10.

Referring now to FIGS. 10-12, multiple vibrators 50" may be positioned in spaced apart relation to each other along the flow surfaces 24 of the guides 22. In this arrangement, molten glass may flow across one of the guides 22, from the upstream end 26 to the downstream end 28 thereof, and may drop from the free edge 30 of the guide 22 onto the upstream end 22 of the next lower guide 22. If multiple vibrators 50" are located along the flow surface 24 of the guide 22, the molten glass may flow over the vibrators 50" as it flows across the guide 22. The energy intensity and frequency of the vibrators 50" may be adjusted in response to the thickness and/or the viscosity of the molten glass flowing over the guides 22. For example, higher intensity and frequency vibrations may be imparted to the guides 22 if needed to compensate for thicker or more viscous flows of molten glass, and vice versa.

Figure 13:
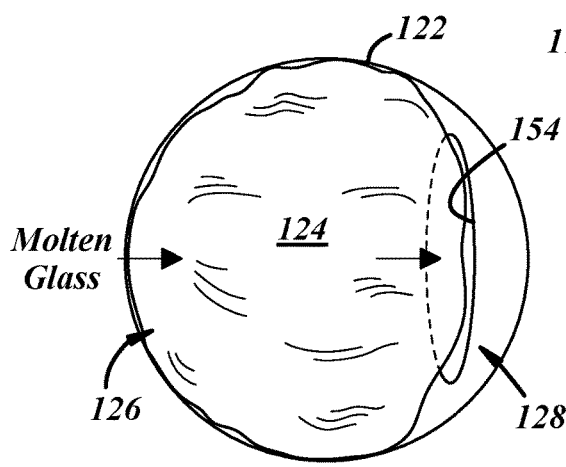
FIG. 13 is a schematic illustration of a top sectional view of an apparatus for refining molten glass, in accordance with a ninth embodiment of the disclosure.
Figure 14:
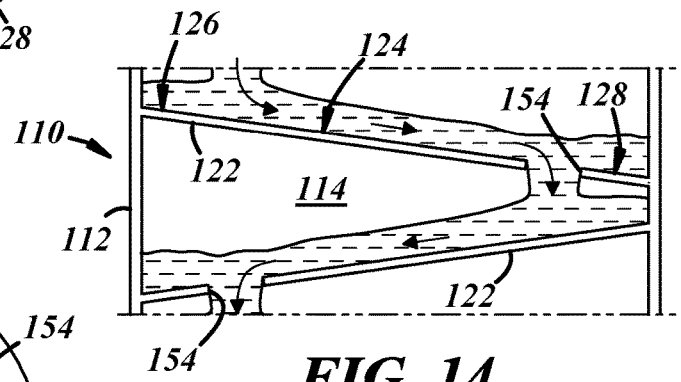
FIG. 14 is an enlarged fragmentary view of the apparatus of FIG. 13.

FIGS. 13 and 14 illustrate an apparatus 110 for refining molten glass, in accordance with another embodiment of the disclosure. The apparatus 110 includes a housing 112 defining an inner chamber 114 and guides 122 that fully extend across the housing 112. The guides 122 have flow surfaces 124 upon which molten glass can flow. The guides 122 may include slots 154 between their upstream and downstream ends 126, 128 so that molten glass can flow from one guide 122 to another via the slots 154. In such case, when molten glass is received at an upstream end 126 of one of the guides 122, the molten glass may flow across the guide 122 towards the downstream end 128 of the guide 122, and then may drop through the slot 154 in the guide 122 onto the upstream end 126 of the next lower guide 122. These types of guides 122 may allow foam on the surface of the molten glass to collect at the downstream ends 128 of the guides 122 such that the foam is skimmed off and separated from the molten glass as it flows through the housing 112.

Figure 15:
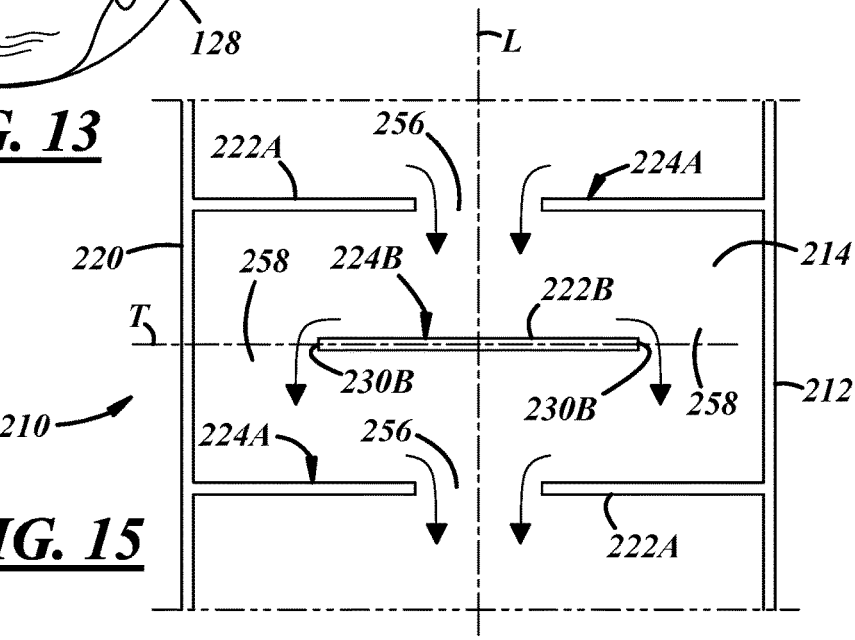
FIG. 15 is a schematic illustration of a side sectional view of a portion of an apparatus for refining molten glass, in accordance with a tenth embodiment of the disclosure.

FIG. 15 illustrates a portion of an apparatus 210 for refining molten glass, in accordance with another embodiment of the disclosure. The apparatus 210 includes a housing 212 defining an inner chamber 214 and alternating first and second guides 222A, 222B. The first and second guides 222A, 222B have first and second flow surfaces 224A, 224B upon which molten glass can flow. The first and second guides 222A, 222B provide different types of passageways through which molten glass can flow. For example, the first guide 222A may include a central passageway 256 and the second guide 222B may be defined by one or more peripheral passageways 258. In this arrangement, molten glass may flow through the central passageway 256 of the first guide 222A, onto the flow surface 224B of the second guide 222B, and then over one or more free edges 230B of the second guide 222B to the next lower guide 222A. The first and second guides 222A, 222B may be segmented or unitary structures, which may or may not be attached to the sidewall 220 of the housing 12. In some embodiments, the first guide 222A may be annular in shape and the second guide 222B may be in the shape of a disc, with the relative dimensions of the first and second guides 222A, 222B being such that the second guide 222B and the central passageway 256 of the first guide 222A are in overlapping relationship when viewed along the longitudinal axis L of the chamber 214.

Figure 16:
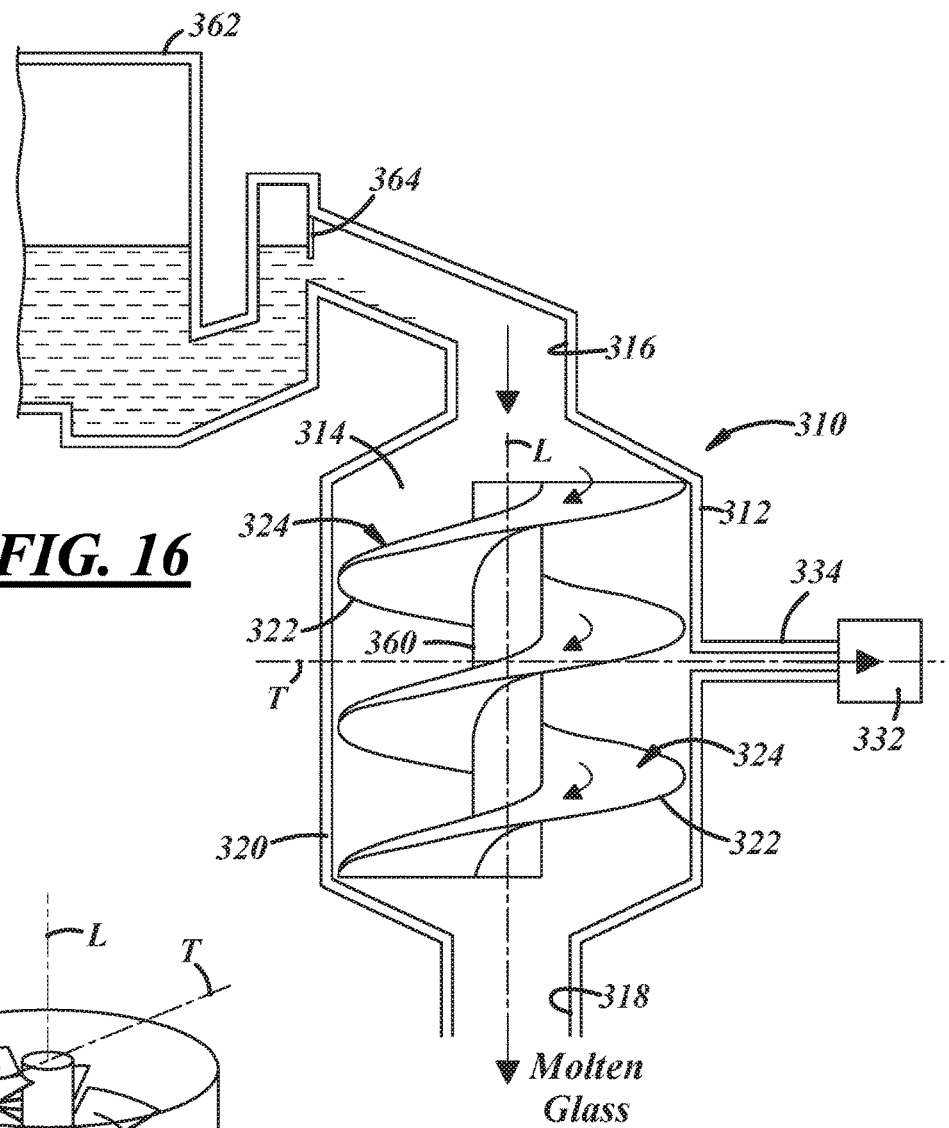
FIG. 16 is a schematic illustration of a side sectional view of an apparatus for refining molten glass, in accordance with an eleventh embodiment of the disclosure.

FIG. 16 illustrates an apparatus 310 for refining molten glass, in accordance with yet another embodiment of the disclosure. The apparatus 310 includes a housing 312 that defines an inner chamber 314 having a vertically oriented longitudinal axis L and a transverse axis T perpendicular to the longitudinal axis L. Unrefined molten glass is received at an upper end of the chamber 314 and refined molten glass is discharged from a lower end of the chamber 314. The housing 312 includes an inlet 316 through which a stream of unrefined molten glass may be received, an outlet 318 through which a stream of refined molten glass may be discharged, and a sidewall 320 that extends between the inlet 316 and the outlet 318 of the housing 312. In this embodiment, molten glass is received at the inlet 316 of the housing 312 and is distributed over a helical guide 322.

The helical guide 322 provides a flow surface 324 upon which molten glass can flow between the upper end and the lower end of the chamber 314. Molten glass is directed through the chamber 314 by the guide 322 such that it flows in a generally downward direction through the chamber 314 and in an oblique direction relative to the transverse axis T of the housing 12. More specifically, molten glass is directed by the helical guide 322 such that it revolves around the longitudinal axis L of the chamber 314 in the form of a spiral. The helical guide 322 may be carried by a central shaft 360 that may extend along the longitudinal axis L of the chamber 314.

The apparatus 310 also may include a vacuum pump and evacuation system 332 with a vacuum port 334 for creating a sub-atmospheric pressure environment within the chamber 314. One or more heaters and/or vibrators may be located within the chamber 314 for supplying heat or vibration energy to the molten glass as it flows over the helical guide 322. One or more barriers also may be located along the flow surface 324 of the helical guide 322 to help maintain a desired level of molten glass over the helical guide 322 and/or help direct the flow of molten glass over the guide 322.

In the embodiment illustrated in FIG. 16, a continuous stream of molten glass is introduced into the apparatus 310 by allowing a controlled amount of molten glass to continuously flow from a body of molten glass held within a glass melting furnace 362 into the chamber 314. The body of molten glass may have a free surface located above the upper end of the chamber 314 such that molten glass can flow by gravity from the furnace 362 into the chamber 314. A flow control device 364 may be placed in the flow path of the molten glass, upstream of the inlet 316, to regulate the amount of molten glass that enters chamber 314. The flow control device 364 also may help dissipate or reduce the amount of foam on the surface of the molten glass that enters the chamber 314.

Figure 17:
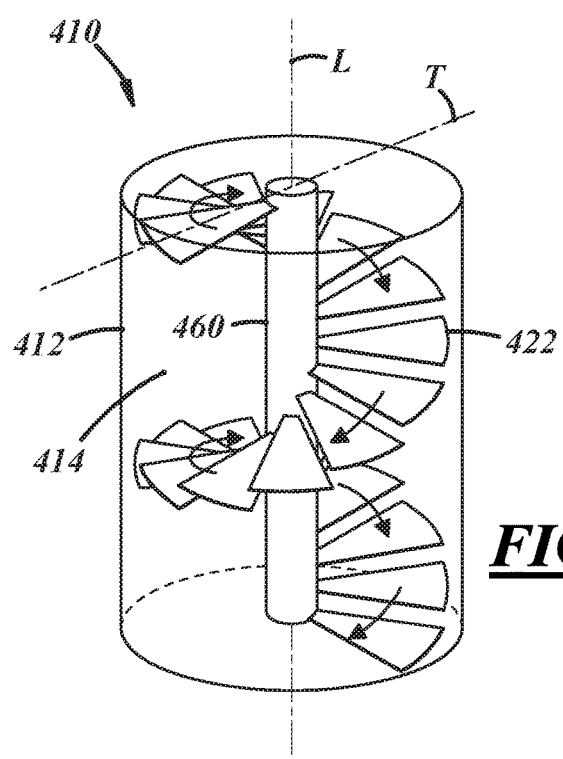
FIG. 17 is a schematic illustration of a perspective view of a portion of an apparatus for refining molten glass, in accordance with a twelfth embodiment of the disclosure.

FIG. 17 illustrates an apparatus 410 for refining molten glass, in accordance with another embodiment of the disclosure. The apparatus 410 includes a housing 412 that defines an inner chamber 414 having a vertically oriented longitudinal axis L and a transverse axis T perpendicular to the longitudinal axis L. Unrefined molten glass is received at an upper end of the chamber 414 and is distributed over a successive series of guides 422 that extend radially outwardly from a central shaft 460. In this embodiment, the flow direction of the molten glass changes as it flows from one guide 422 to another. In other embodiments, however, some or all of the guides 422 may be arranged such that molten glass cascades from one guide 422 to another while following a generally straight path through the chamber 414.

The process and apparatus for refining molten glass disclosed herein may be used to refine various silica-based glass compositions as well as glass precursor compositions, and may be retrofitted or incorporated into various glass manufacturing processes and various glass furnace designs, including, but certainly not limited to, the illustrative glass manufacturing processes and glass furnace designs shown in the drawings and described herein. For example, the process and apparatus disclosed herein may be used to refine molten glass that has been melted in a vacuum induction melter, a submerged combustion melter, or any other suitable melting furnace.

There thus has been disclosed a process and an apparatus for refining a stream of molten glass, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. An apparatus for refining molten glass that includes:
 a housing having a vertically oriented longitudinal axis, a transverse axis perpendicular to said longitudinal axis, a circular transverse cross section, a length measured along the longitudinal axis, and a width measured along the transverse axis;

an unrefined molten glass inlet at an upper end of said housing to receive unrefined molten glass;
a refined molten glass outlet at a lower end of said housing to discharge refined molten glass from said housing; and
a guide positioned within said housing and having a flow surface upon which molten glass can flow between said inlet and said outlet of said housing so as to distribute a volume of molten glass over the flow surface of the guide.

2. The apparatus set forth in claim 1 wherein said guide directs molten glass to flow in a parallel or oblique direction relative to the transverse axis of said housing.

3. The apparatus set forth in claim 1 wherein said flow surface of said guide continuously extends from said upper end to said lower end of said housing.

4. The apparatus set forth in claim 3 wherein said flow surface of said guide follows a helical path from said upper end to said lower end of said housing.

5. The apparatus set forth in claim 1 wherein said guide includes a plurality of guides extending in a downward direction at an oblique angle and having flow surfaces that are spaced apart from one another along said longitudinal axis of said housing.

6. The apparatus set forth in claim 5 wherein said plurality of guides are alternately arranged on opposite sides of said housing such that said flow surfaces of said guides overlap one another along said longitudinal axis of said housing.

7. The apparatus set forth in claim 5 wherein at least one of said guides includes a slot between an upstream end and a downstream end thereof through which molten glass can flow.

8. The apparatus set forth in claim 1 wherein said guide includes a barrier along said flow surface to maintain a generally uniform level of molten glass thereon.

9. The apparatus set forth in claim 1 wherein said flow surface of said guide extends partway across said housing.

10. The apparatus set forth in claim 9 wherein said flow surface of said guide extends radially outwardly from said longitudinal axis of said housing.

11. The apparatus set forth in claim 1 wherein said flow surface of said guide extends radially inwardly from said housing.

12. The apparatus set forth in claim 1 that also includes:
a vacuum pump and evacuation system to draw off gases that are released from molten glass flowing through said housing.

13. The apparatus set forth in claim 1 that also includes: vibrators for adding vibration energy to molten glass that is flowing through said housing.

14. The apparatus set forth in claim 1 that also includes:
a heating system for controlling the temperature of molten glass flowing through said housing.

15. The apparatus set forth in claim 1 wherein said guide includes a series of guides that direct molten glass through said housing such that the molten glass cascades over said guides in succession.

16. The apparatus set forth in claim 15 wherein said guide includes a series of guides that are arranged such that molten glass flowing from said upper end to said lower end of said housing repeatedly intersects said longitudinal axis of said housing.

17. The apparatus set forth in claim 1 wherein said guide is configured such that molten glass flowing from said upper end to said lower end of said housing repeatedly passes from one side of said longitudinal axis of said housing to another, without intersecting said longitudinal axis.

18. The apparatus set forth in claim 1 wherein said guide is configured such that molten glass flowing from said upper end to said lower end of said housing repeatedly revolves around said longitudinal axis of said housing.

19. The apparatus set forth in claim 1 wherein the length of said housing is greater than the width of said housing and the housing has a transverse cross-sectional area between 0.5 square meters and 20 square meters and wherein said flow surface has a surface area between 50 square meters and 500 square meters, such that the surface area of the flow surface is 2.5 to 1,000 times greater than the transverse cross-sectional area of the housing.

20. An apparatus comprising:
a molten glass refining apparatus that includes:
a housing having a vertically oriented longitudinal axis, a transverse axis perpendicular to said longitudinal axis, a circular transverse cross section, a length measured along the longitudinal axis, and a width measured along the transverse axis;
an unrefined molten glass inlet at an upper end of said housing to receive unrefined molten glass;
a refined molten glass outlet at a lower end of said housing to discharge refined molten glass from said housing; and
a guide positioned within said housing having a flow surface upon which molten glass can flow between said inlet and said outlet of said housing so as to distribute a volume of molten glass over the flow surface of the guide; and
a glass melting furnace having a body of molten glass with a free surface above the unrefined molten glass inlet of the refining apparatus such that molten glass can flow by gravity from the furnace into the unrefined molten glass inlet of the refining apparatus.

21. The apparatus set forth in claim 20, further comprising a flow control device in a flow path of the molten glass, upstream of the inlet of the refining apparatus, to regulate an amount of molten glass that enters the refining apparatus.

22. An apparatus comprising:
a molten glass refining apparatus that includes:
a housing having a vertically oriented longitudinal axis, a transverse axis perpendicular to said longitudinal axis, a circular transverse cross section, a length measured along the longitudinal axis, and a width measured along the transverse axis;
an unrefined molten glass inlet at an upper end of said housing to receive unrefined molten glass;
a refined molten glass outlet at a lower end of said housing to discharge refined molten glass from said housing; and
a guide positioned within said housing having a flow surface upon which molten glass can flow between said inlet and said outlet of said housing so as to distribute a volume of molten glass over the flow surface of the guide; and
a submerged combustion melter having a body of molten glass with a free surface above the unrefined molten glass inlet of the refining apparatus such that molten glass can flow by gravity from the furnace into the unrefined molten glass inlet of the refining apparatus.

* * * * *